(12) United States Patent
Chern et al.

(10) Patent No.: US 9,542,056 B2
(45) Date of Patent: Jan. 10, 2017

(54) RESISTIVE FORCE SENSING CIRCUIT

(71) Applicant: Uneo Incorporated, Taipei (TW)

(72) Inventors: Yann-Cherng Chern, New Taipei (TW); Chih-Tsung Cheng, New Taipei (TW)

(73) Assignee: Uneo Incorporated, Taipei (TW)

( * ) Notice: Subject to any disclaimer, the term of this patent is extended or adjusted under 35 U.S.C. 154(b) by 23 days.

(21) Appl. No.: 14/282,431

(22) Filed: May 20, 2014

(65) Prior Publication Data

US 2015/0338967 A1  Nov. 26, 2015

(51) Int. Cl.
  *G06F 3/045* (2006.01)
  *G06F 3/041* (2006.01)
  *G06F 1/16* (2006.01)

(52) U.S. Cl.
  CPC .......... *G06F 3/045* (2013.01); *G06F 1/16* (2013.01); *G06F 3/0414* (2013.01); *G06F 3/0416* (2013.01); *G06F 2203/04104* (2013.01)

(58) Field of Classification Search
  CPC .................. G06F 3/0414; G06F 3/045
  USPC ...................... 178/18.05; 345/174
  See application file for complete search history.

(56) References Cited

U.S. PATENT DOCUMENTS

| | | | | |
|---|---|---|---|---|
| 4,481,815 A | * | 11/1984 | Overton | G01L 1/205 338/114 |
| 5,159,159 A | * | 10/1992 | Asher | G01L 1/205 178/18.05 |
| 6,441,807 B1 | * | 8/2002 | Yamaguchi | 345/173 |
| 2005/0275634 A1 | * | 12/2005 | Chi et al. | 345/173 |
| 2009/0256817 A1 | * | 10/2009 | Perlin | G06F 3/0233 345/174 |
| 2011/0234508 A1 | * | 9/2011 | Oda et al. | 345/173 |
| 2012/0162122 A1 | * | 6/2012 | Geaghan | 345/174 |
| 2013/0076646 A1 | * | 3/2013 | Krah | G06F 3/0414 345/173 |

* cited by examiner

*Primary Examiner* — Sanjiv D Patel
(74) *Attorney, Agent, or Firm* — Wang Law Firm, Inc.

(57) ABSTRACT

A resistive force sensing circuit and a resistive force sensing apparatus. The circuit includes a plurality of sensor circuit inputs, a plurality of sensor circuit outputs; and a plurality of resistor units. Each of the resistor units includes a force-sensing resistor, a first side resistor, and a second side resistor. The first terminals of the force-sensing resistor, the first side resistor and the second side resistor are electrically connected to each other at one node, a second terminal of the force-sensing resistor is electrically connected to one of the sensor circuit inputs, and second terminals of the first side resistor and the second side resistor are electrically connected to two adjacent sensor circuit outputs, respectively. The first side resistor and the second side resistor are a pair of resistors with substantially equal resistance. The apparatus includes structures to realize the function of the resistive force sensing circuit.

13 Claims, 13 Drawing Sheets

RESISTIVE FORCE SENSING CIRCUIT

BACKGROUND OF THE INVENTION

1. Field of the Invention

The present invention generally relates to a resistive force sensing circuit for sensing physically-applied inputs and a resistive force sensing apparatus thereof.

2. Description of the Related Art

Currently, touch sensing has been successfully applied in many fields, such as portable device input, medical monitor and electronic point of sale (POS) system. Touch control mechanisms include: resistive, capacitive, optical, etc. Resistive sensing has an advantage in its ability to combine touch and force sensing through force-sensing resistor (FSR). Although early resistive touch control technique can only detect one touch point, various solutions can offer multi-touch or force-sensing points recently.

However, in many cases, when an input device with a simple FSR matrix circuit contains multi-point force-sensing function, the output value can be affected by the number of input pressure points and force levels. That is, even the user applies the same force on one point of the device, the output value of the point can change depending on how the rest of the sensing surface is touched. This may cause "ghost point" phenomenon, when the system output a touch point at a location not touched. Furthermore, the input device with a simple FSR array or matrix circuit may have high leakage currents between each input point or part, which may interfere with the output values and consume more power.

Although there have been many solutions to overcome the problems described above, such solutions usually utilize extra components such as op-amps, or complex algorithms. Therefore, the costs of production and maintenance of such solutions inevitably become higher, in addition to increased chance of malfunction

SUMMARY OF THE INVENTION

Therefore, it is a primary objective of the present invention to provide a resistive force sensing circuit and a resistive force sensing apparatus thereof to realize multi-point force-sensing function with a simple circuit configuration and algorithm.

To achieve the foregoing objective, the present invention provides a resistive force sensing circuit that comprises a plurality of sensor circuit inputs, a plurality of sensor circuit outputs, and a plurality of resistor units. Each resistor unit comprises a force-sensing resistor, a first side resistor, and a second side resistor. The first terminals of the force-sensing resistor, the first side resistor and the second side resistor are electrically connected to each other at one node, a second terminal of the force-sensing resistor is electrically connected to one sensor circuit input, and second terminals of the first side resistor and the second side resistor are electrically connected to two adjacent sensor circuit outputs, respectively. The first side resistor and the second side resistor have substantially equal resistance values.

In a preferred embodiment of the present invention, the plurality of sensor circuit inputs are configured as columns of a matrix and sensor circuit outputs of the sensor circuit outputs are configured as rows. In another embodiment, the plurality of sensor circuit inputs are configured as rows of a matrix, and the sensor circuit outputs are configured as columns. In both embodiments, the plurality of force sensing resistor units represent matrix elements as defined by intersections of the sensor circuit inputs and the nodes of two side resistors between adjacent sensor circuit outputs.

In a preferred embodiment of the present invention, the sensor circuit inputs are electrically connected to a drive circuit, where the drive circuit sequentially scans the sensor circuit inputs, and the sensor circuit outputs are electrically connected to a scan circuit, where the scan circuit sequentially measures voltage at sensor circuit outputs.

In a preferred embodiment of the present invention, the force-sensing resistors used in the resistive force sensing circuit have substantially identical resistance values for the same force level.

In a preferred embodiment of the present invention, the drive circuit sequentially scans the sensor circuit inputs and the scan circuit sequentially measures the output voltage value of the sensor circuit outputs. That is, only one resistor unit (or one force input point) receives a drive voltage and gives a voltage signal at a time, where the voltage signal can be analog. In the scanning process of each resistor unit, since the measured output voltage is reduced with the number of the sensor circuit inputs increasing, a voltage adjustment method can be applied. Similarly, the voltage adjustment method can be used to determine the input force level more precisely.

In a preferred embodiment of the present invention, the drive circuit can include a digital-to-analog convertor, and the voltage adjustment method can include increasing the drive voltage via the digital-to-analog convertor.

In a preferred embodiment of the present invention, the scan circuit can include an analog-to-digital convertor, which can convert an analog voltage signal to a digitalized voltage signal depending on a reference voltage, and the voltage adjustment method can include adjusting the reference voltage.

The present invention further provides a resistive force sensing apparatus that comprises a plurality of sensor output electrodes, a plurality of sensor input electrodes, and a plurality of resistor structures. Each of the resistor structures comprises a force-sensing resistor part, a first side resistor part, and a second side resistor part, wherein the force-sensing resistor part becomes electrically connected to one of the sensor input electrodes when a force input with sufficient magnitude is applied on a position corresponding to the force-sensing resistor structure, the first and second side resistor parts are electrically connected to the force-sensing resistor part, and the first and second side resistor parts are electrically connected two adjacent sensor output electrodes, respectively. The first and second side resistor parts have substantially equal resistance values.

In a preferred embodiment of the present invention, the plurality of sensor input electrodes are a plurality of conductive strips arranged in parallel, and the plurality of sensor output electrode are a plurality of conductive strips arranged in parallel and perpendicular to the plurality of sensor input electrodes.

In a preferred embodiment of the present invention, all of the first side resistor parts and the second resistor parts of the resistive force sensing apparatus are substantially continuous.

In a preferred embodiment of the present invention, the resistive force sensing apparatus further comprises a plurality of spacers. At one sensing point, if there is no force input at a part of the resistive force sensing apparatus, the spacer separates the sensor input electrode and the resistor structure corresponding to the part of the resistive force sensing apparatus, making the sensor input electrode and the sensor output electrodes corresponding to the part of the resistive force sensing apparatus form an open-loop.

The resistive force sensing circuit and the resistive force sensing apparatus thereof according to the present invention are provided to detect force input position and level at multiple points, so that the present invention has the following advantages:

(1) The resistive force sensing circuit of the present invention can use a pair of two electrically identical resistors in each resistor unit so that the resistive force sensing circuit and the resistive force sensing apparatus can realize multi-point force-sensing function with a simple circuit structure and scanning method.

(2) The resistive force sensing circuit of the present invention can use the digital-to-analog convertor in the drive circuit or the analog-to-digital convertor in the scan circuit, so as to solve the voltage signal drop problem when the number of the sensor circuit outputs increases or a precise measurement is required.

(3) The resistive force sensing apparatus of the present invention can separate the resistor units for sensing force inputs by a pair of side resistors to reduce leakage currents between the resistor units, so as to reduce the interference between the resistor units.

(4) The resistive force sensing apparatus of the present invention can use continuous side resistor parts to simplify the production process, so as to reduce the cost of production.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

Figure 1:
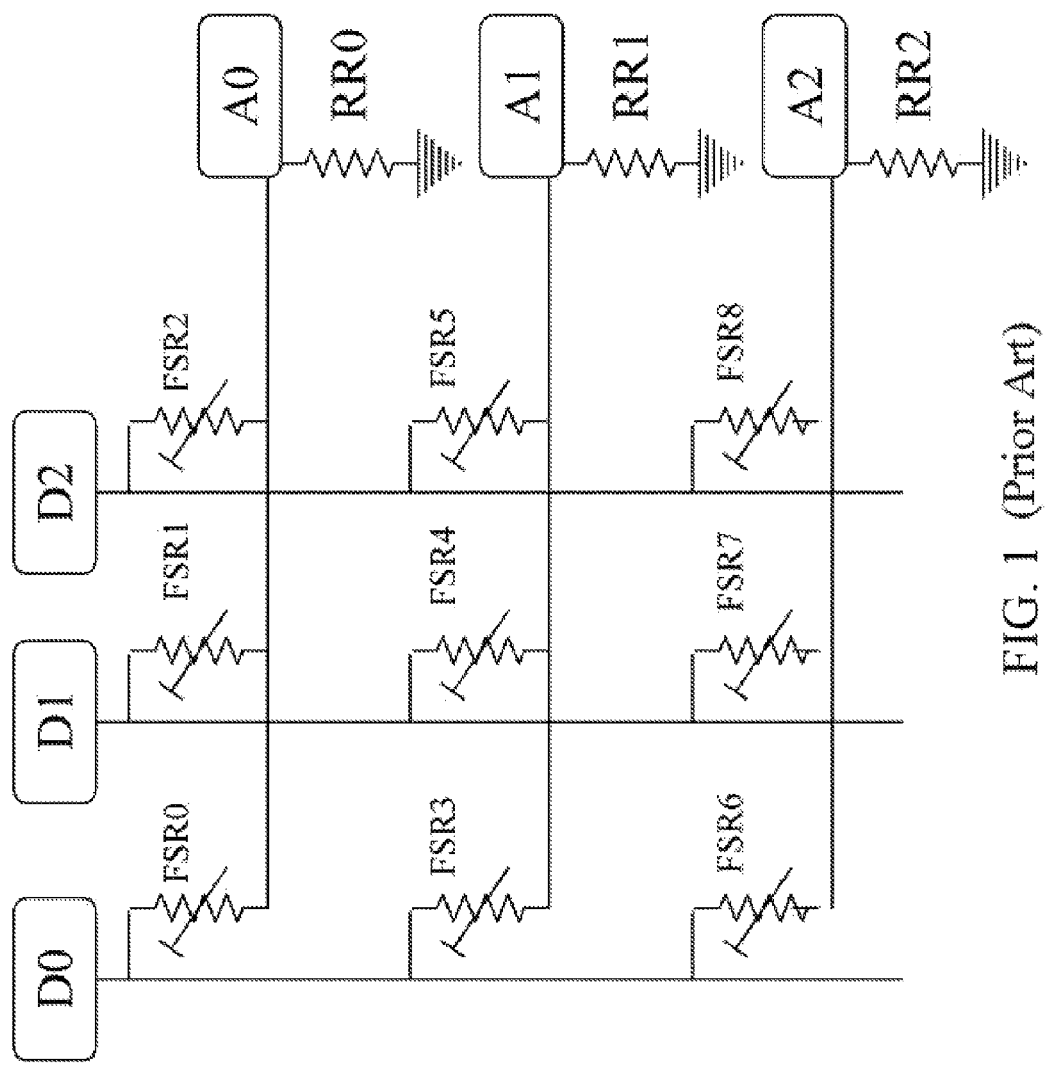
FIG. 1 is a schematic circuit diagram of a conventional resistive force sensing circuit for sensing forces at multiple points.

The technical content of the present invention will become apparent by the detailed description of the following embodiments and the illustration of related drawings as follows. The like elements will be denoted as the same reference numerals in the related drawings.

With reference to FIG. 1 for a schematic circuit diagram of a conventional resistive force sensing circuit for sensing forces at multiple points, the resistive force sensing circuit have sensor circuit inputs D0, D1 and D2, sensor circuit output A0, A1 and A2, force-sensing resistor FSR0 to FSR8, and grounded resistor RR1, RR2 and RR3. The intersections of sensor circuit inputs D0, D1 and D2 and sensor circuit outputs A0, A1 and A2 define force-sensing point where the force-sensing resistors FSR0 to FSR8 respectively electrically connect sensor circuit inputs D0, D1 and D2 to sensor circuit outputs A0, A1 and A2. The grounded resistors RR1, RR2, and RR3 prevent the sensor circuit inputs D0, D1 and D2 from being electrically connected to the ground through only small resistance and being damaged while the resistance values of the force-sensing resistors FSR0 to FSR8 are small.

In a test, simple scanning method is used to test the conventional resistive force sensing circuit. The sensor circuit inputs D0, D1 and D2 are electrically connected to a drive circuit, and sensor circuit outputs A0, A1 and A2 are electrically connected to a scan circuit. The drive and scan circuits sequentially scan the resistive force sensing circuit. That is, the drive circuit sequentially provides a DC voltage to one of the sensor circuit input, and other sensor circuit inputs keep lower voltage or are grounded. The scan circuit sequentially measures the voltage value of the sensor circuit outputs. For example, first, the drive circuit provides 3.3V DC voltage to the sensor circuit input D0, and the scan circuit measures the voltage value of the sensor circuit output A0 and sends the measured voltage value to where the voltage value can be stored (e.g. memory built in microcontroller unit). Second, the drive circuit provides 3.3V DC voltage to the sensor circuit input D0, and the scan circuit measures the voltage value of the sensor circuit output A1 and sends the measured voltage value to where the voltage value can be stored. Then, a DC supply is applied on the sensor circuit input D0 and the voltage value of the sensor circuit output A2 are read and stored. After the sensor circuit input D0 and the sensor circuit output A2 are scanned, the drive circuit provides 3.3V DC voltage to the sensor circuit input D1, and the scan circuit measures the voltage value of the circuit output A0 and sends the measured voltage value to where the voltage value can be stored. The whole scanning process follows this order until the last intersection, i.e. the sensor circuit input D2 and sensor circuit output A2 in FIG. 1, is scanned.

When a user apply a force on one intersection of sensor circuit inputs D0, D1 and D2 and sensor circuit outputs A0, A1 and A2, one of the force-sensing resistor FSR0 to FSR8 corresponding to the intersection changes its resistance value; therefore, the output value of the scan related to the force-sensing resistor changes. For example, if the user applies a force on the intersection of the sensor circuit input D1 and the sensor circuit output A1, the resistance value of the force-sensing resistor FSR4 changes. Therefore, during the scanning process, when the sensor circuit input D1 is applied DC voltage, the voltage value of the sensor circuit output A1 read by the output drive circuit will change with the resistance change of the force-sensing resistor FSR4 changes, and the result can be used to derive that there is a force present in the scanning period. In addition, with the value of output voltage change, if the relationship between output voltage change and resistance change and the relationship between resistance change and the magnitude of the applied force are known, the magnitude of the applied force at the position of the intersection can also be derived. Such relationships can be obtained by testing different magnitude of force at each intersection position of the resistive force sensing circuit in advance.

Figure 2:
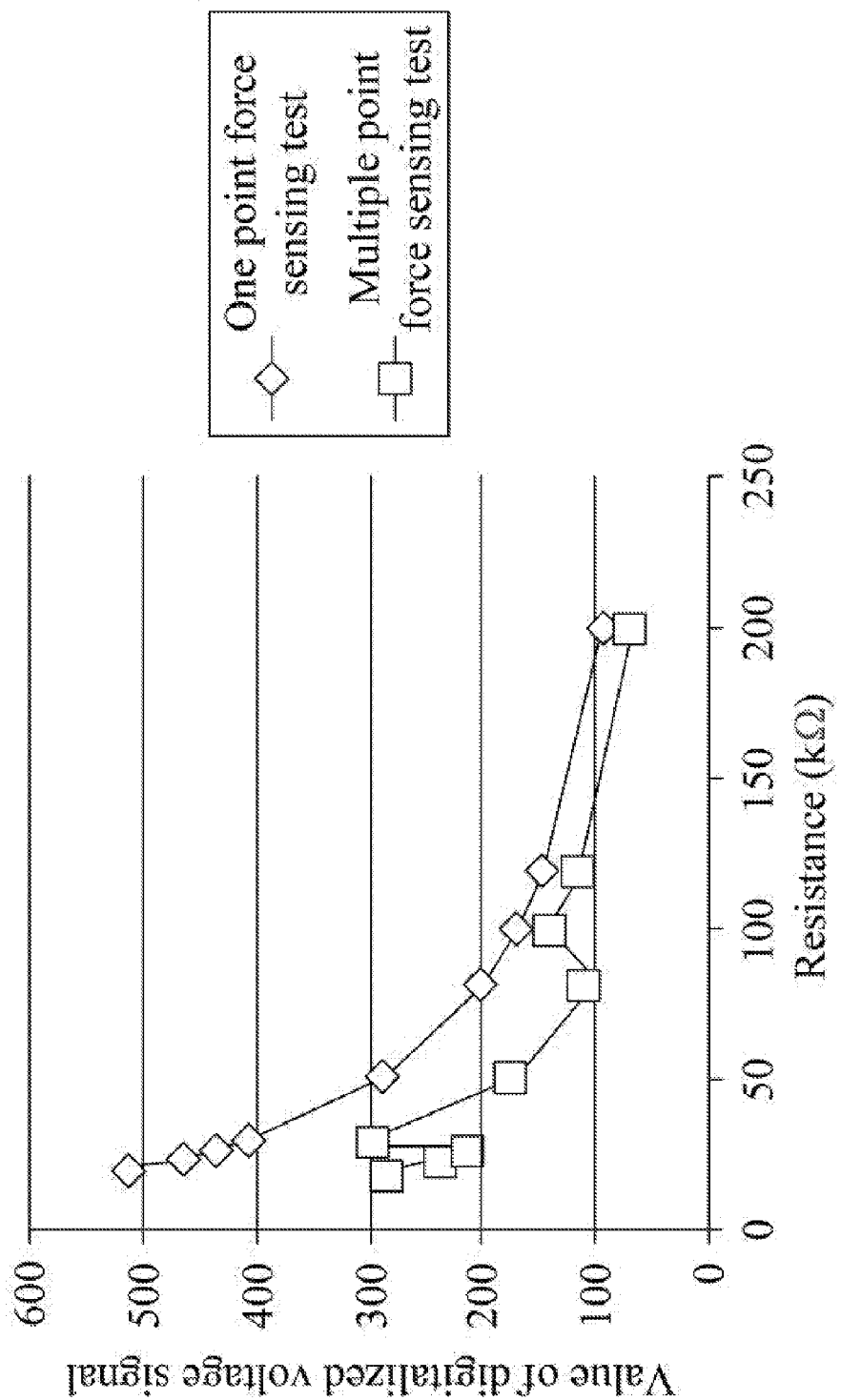
FIG. 2 is a plot showing scanning output value versus resistance value of each force-sensing resistor relationship along one point and multiple point force input situations of the circuit of FIG. 1.

FIG. 2 is a plot showing scanning output value versus resistance value of each force-sensing resistor relationship along one point and multiple point force input situations of the circuit of FIG. 1. This plot shows the result of a test of the resistive force sensing circuit of FIG. 1. The test setting is following: the drive voltage for the sensor circuit inputs is 3.3V, and an analog voltage signal provided from the sensor circuit output is digitalized in the range of 0 to 1024, that is, when the analog signal value is 3.3V, the test result digitalized and stored is 1024, when the analog signal value is 0V, the test result digitalized and stored is 0, and when the analog signal value is within the range of 0~3.3V, the test result digitalized and stored linearly corresponds to the analog output voltage value. The value of the digitalized voltage signal versus the resistance value is shown in FIG. 2. The resistance values of grounded resistors RR0, RR1 and RR2 are 20 k Ohm. In one point force sensing test, only one force-sensing resistor has a finite resistance value, and other force-sensing resistors have infinite resistance values or can be seen as open-loops, and in multiple point force sensing test, all force-sensing resistors have finite resistance values for simulating all point having different magnitudes of force input, wherein the resistance values of each force-sensing resistor are: FSR0=20 k Ohm, FSR1=51 k Ohm, FSR2=120 k Ohm, FSR3=27 k Ohm, FSR4=30 k Ohm, FSR5=200 k Ohm, FSR6=24 k Ohm, FSR7=82 k Ohm, and FSR8=100 k Ohm. In the one point force sensing test, when the resistance of the force-sensing resistor become smaller (corresponding to larger force applied on the force-sensing resistor), the output test result becomes large. For an ideal device or circuit with multi-point force sensing function, whether or not the other points have force inputs, the result of one sensing point in the one point force sensing test and multiple point force sensing test should be the same while the same force level is applied. In other words, since the same force input should relate to the same resistance value of the force-sensing input, if the resistance value of the force-sensing resistor is the same, the output value corresponding to the force-sensing resistor should ideally be the same, regardless of the variation of the resistance value of the other force-sensing resistors. However, as it can be seen in FIG. 2, when the resistance values are 20 k Ohm, 24 k Ohm and 27 k Ohm, the respective values of the digitalized voltage signals 286, 238 and 212 are smaller than 296, which is the value of digitalized voltage signal corresponding to FSR4=30 k Ohm, and when the resistance value is 100 k Ohm, the value of the digitalized voltage signal 138 is larger than 108, which is corresponding to FSR8=82 k Ohm, so there is no aforementioned resistance value versus output value relationship in the multiple points force sensing test case. Besides, from FIG. 2, it cannot be derived that the relationship between resistance value and output value is one-to-one, so even the values of the digitalized voltage signals are known, it is difficult to determine the corresponding resistance values of the force-sensing resistors, so that the information about the magnitudes of applied force cannot be directly obtained.

Figure 3:
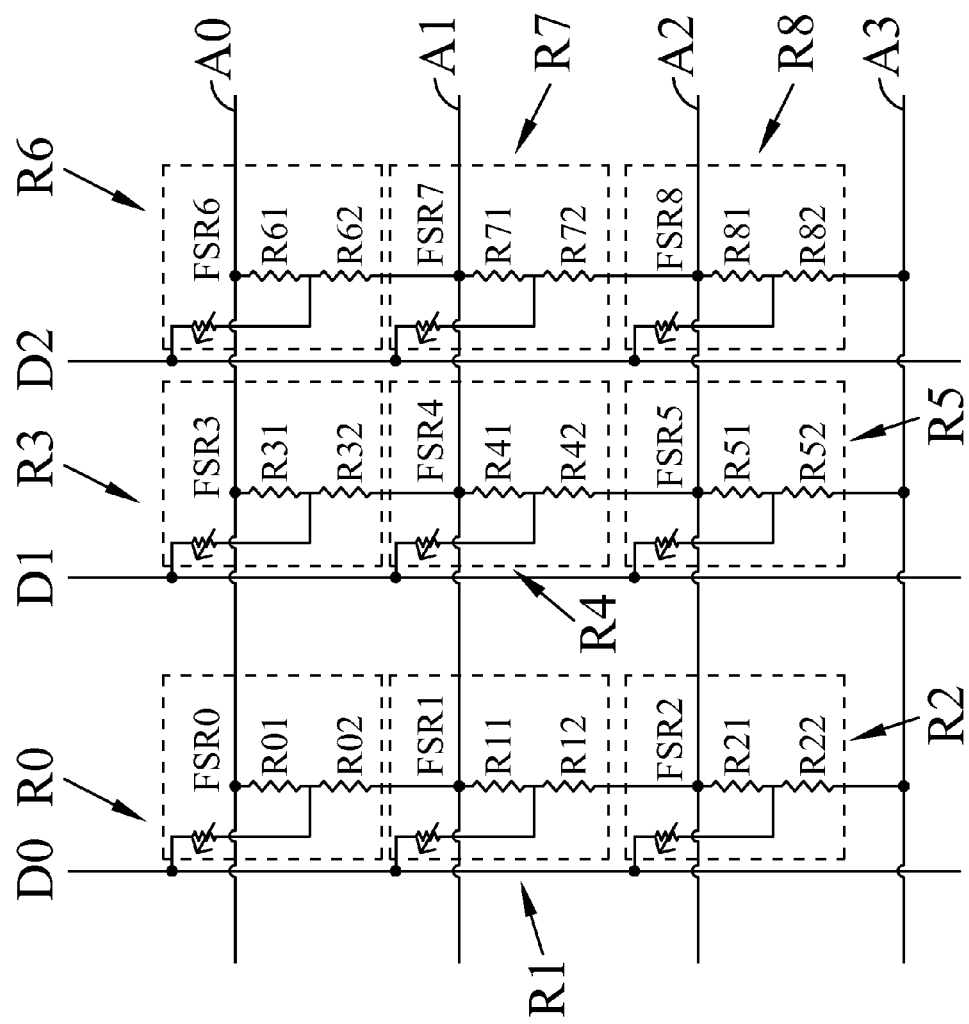
FIG. 3 is a schematic circuit diagram of a resistive force sensing circuit for sensing force levels at multiple points according to the first embodiment of the present invention.

With reference to FIG. 3 for a schematic circuit diagram of a resistive force sensing circuit for sensing force inputs at multiple points according to the first embodiment of the present invention, the resistive force sensing circuit of the first embodiment of the present invention comprises a plurality of sensor circuit inputs D0, D1, and D2, a plurality of sensor circuit outputs A0 to A3 and a plurality of resistor units R0 to R8. Each of the resistor units R0 to R8 comprises a force-sensing resistor FSR0 to FSR8, a first side resistor R01 to R81, and a second side resistor R02 to R82, respectively. In the resistor unit R0, the first terminals of the force-sensing resistor FSR0, the first side resistor R01 and the second side resistor R02 are electrically connected to each other at one node, a second terminal of the force-sensing resistor FSR0 is electrically connected to the sensor circuit inputs D0, and second terminals of the first side resistor R01 and the second side resistor R02 are electrically connected to two adjacent sensor circuit outputs A0 and A1, respectively. The first side resistor and the second side resistor R01 and R02 are a pair of resistors with substantially equal resistance. The configurations of the other resistor units R1 to R8 are the same or similar to the resistor unit R0 as the above described.

In this preferred embodiment, the plurality of sensor circuit inputs D0, D1, and D2 are configured as columns in a matrix, and sensor circuit outputs, A0, A1, A2 and A3 are configured as rows in the matrix, or the plurality of sensor circuit inputs D0, D1, and D2 are configured as rows in a matrix, and the sensor circuit outputs, A0, A1, A2 and A3 are configured as columns in the matrix. The plurality of resistor units R0 to R8 are configured as matrix units defined by intersections of the sensor circuit inputs D0, D1, and D2 and the nodes of two side resistors between adjacent sensor circuit outputs among sensor circuit outputs A0, A1, A2 and A3.

Figure 4:
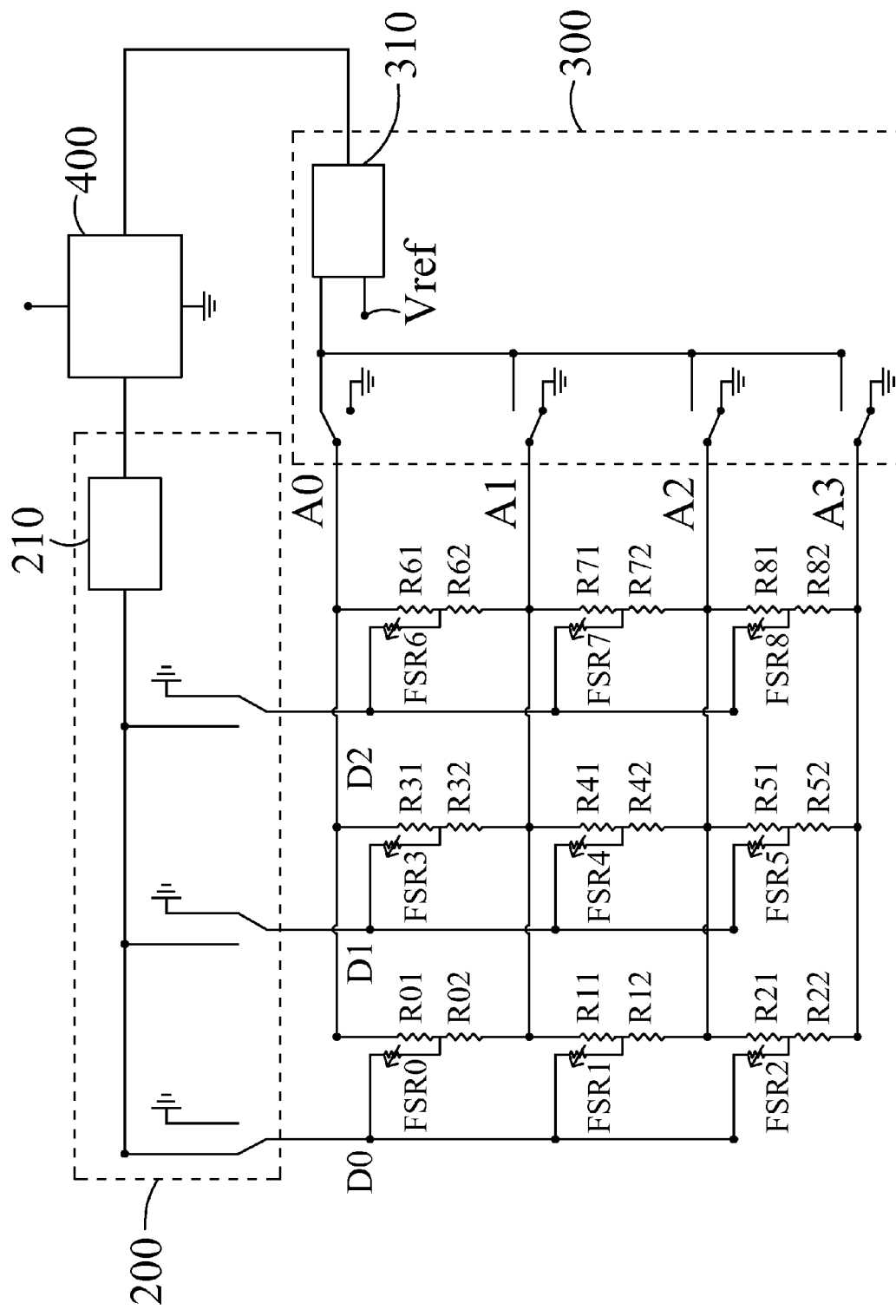
FIG. 4 is a schematic circuit diagram of a resistive force sensing circuit for sensing force levels at multiple points according to the second embodiment of the present invention.

FIG. 4 is a schematic circuit diagram of a resistive force sensing circuit for sensing forces at multiple points according to the second embodiment of the present invention. The resistive force sensing circuit of the second embodiment in FIG. 4 is similar to that of the first embodiment, except for a drive circuit 200, a scan circuit 300 and a microcontroller unit (MCU) 400 added and electrically connected to the circuit structure shown in FIG. 3.

In this preferred embodiment, the sensor circuit inputs D0, D1, and D2 are electrically connected to a drive circuit 200, where the drive circuit 200 sequentially scans the sensor circuit inputs D0, D1, and D2, and the sensor circuit outputs A0 to A3 are electrically connected to a scan circuit 300, where the scan circuit 300 sequentially measures the sensor circuit outputs A0 to A3. The MCU 400 may be connected to the drive circuit 200 and the scan circuit 300 to further control the drive circuit 200 or handle the voltage signal from the scan circuit 300.

The similar scanning process as the conventional resistive force sensing circuit of FIG. 1 can be used on the resistive force sensing circuit of the second embodiment of the present invention, but a simple algorithm is required to be performed to separate the output value resulted from different force-sensing resistors FSR0 to FSR8. One of examples of such algorithms will be described in reference with drawings hereafter. In that case, the sensor circuit outputs which are not driven by the output driving circuit are grounded. Since the first and second resistors R01 to R81 and R02 to R82 exist, the grounded resistors in the conventional resistive force sensing circuit are not required.

Figure 5A:
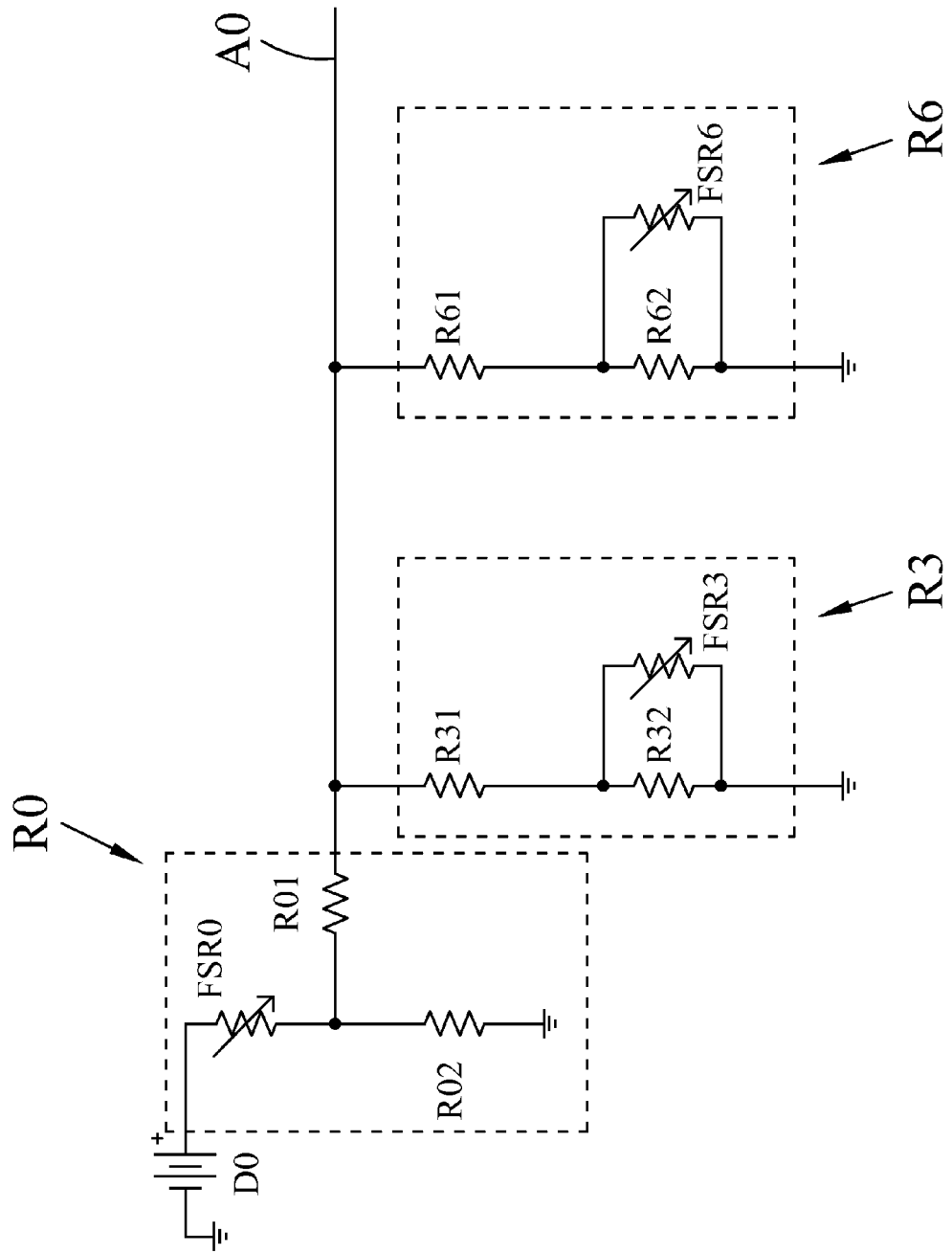
FIGS. 5A and 5B are schematic circuit diagrams of equivalent circuits of the resistive force sensing circuit of FIG. 4 under two different scanning configurations.
Figure 5B:
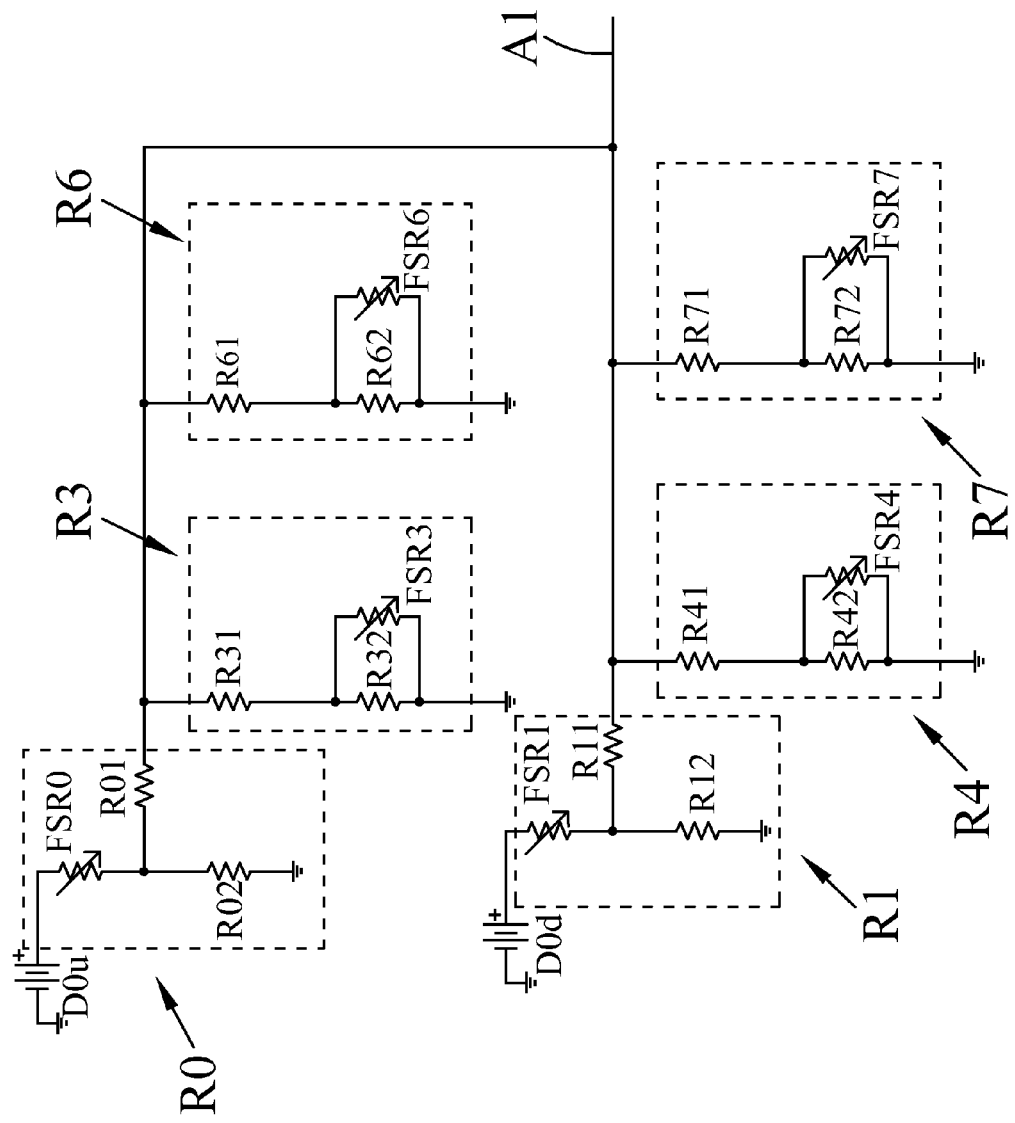

FIGS. 5A and 5B are schematic circuit diagrams of equivalent circuits of the resistive force sensing circuit of FIG. 4 for two different scanning configurations. With reference to FIGS. 5A and 5B, the scanning method used in this embodiment will be described in detail. In following description, the scanning step where the sensor circuit input D0 is a driving input (i.e., a drive voltage from the drive circuit 200 is provided on the sensor circuit input D0) and the sensor circuit output A0 is a scanning output (i.e., the voltage signal output from the sensor circuit output A0 is measured by the scan circuit 300) is expressed as a scanning step D0A0. Hereinafter, an analog voltage signal output from the sensor circuit output A0 in the scanning step D0A0 can be further digitalized, and the value of the digitalized voltage signal is expressed as f(D0A0). In addition, the condition that all of the first and second side resistors substantially have equal resistance values is assumed (otherwise the algorithm will become more complex). The other scanning steps and digitalized output voltage values follow the above expressions. In the scanning step D0A0, the equivalent circuit is like the circuit of FIG. 5A. The drive voltage from the drive circuit 200 is provided on the sensor circuit input D0. There are only the force-sensing resistors FSR0, FSR3 and FSR6 presented in FIG. 5A, the other force-sensing resistors are substantially grounded so that they will not affect the sensor circuit output A0. Here, the two resistor units R3 and R6 can form two equivalent resistors KR3 and KR6, respectively, and the resistance values of the equivalent resistors KR3 and KR6 are substantially determined by the resistance values of the first side resistors R31 and R61 and the second resistors R32 and R62. For example, if the resistance value R31=R32=20 k Ohm, no matter how the resistance value of the force-sensing resistor FSR3 changes, the resistance value of the equivalent resistor KR3 is in the range of 10 k~20 k Ohm. Next, please refer to FIG. 5B, which is the circuit diagram in the scanning step D0A1. Since the circuit is linear, the scanned voltage signal can be seen as the superposition of the results of two DC drive voltage supplies. The equivalent circuit seen by the upper DC supply D0$u$ (another DC supply D0$d$ is seen as a close loop in this case) in FIG. 5B in fact is similar to the circuit in FIG. 5A except that the value of the voltage signal (referred as f (FSR0) hereinafter) from the upper DC supply D0$u$ in FIG. 5B is the value of the digitalized voltage signal of the voltage from the node where the first side resistor R01 and five resistor units R1, R2, R3, R4 and R5 in parallel are connected. The value of the voltage signal (referred as f(FSR3) hereinafter) from the lower DC supply D0$d$ (another DC supply D0$u$ is seen as a close loop in this case) in FIG. 5B is the value of the digitalized voltage signal of the voltage signal from the node where the first side resistor R21 and five resistor units R0, R3, R6, R5 and R7 in parallel are connected. As above described, all the resistor units mentioned here can be seen as the equivalent resistors. In FIG. 5A, since the resistance value of the equivalent resistors in parallel is smaller than the resistance value of one side resistor so that the currents flow though the first side resistor R01 and the second side resistor R02 generally have little change with the variation of the number of the equivalent resistors in parallel and electrically connected to the side resistor R02, and the resistance values of all of the side resistors are substantially equal, the ratio of the value of the digitalized voltage signal f(D0A0) to the value of the voltage signal f(FSR0) from the upper DC supply D0$u$ in FIG. 5B should be inversely proportional to the ratio of the number of the resistor units in parallel electrically connected to the first side resistor R01 in FIG. 5A to the number of the resistor units in parallel electrically connected to the first side resistor R01 in FIG. 5B. For practical purpose, the value of f(D0A0) divided by 2 can be supposed be equal to f (FSR0) (In fact, the value of f (D0A0) should be divided by $(2n-1)/(n-1)$, where n is the number of the sensor circuit inputs, but with n grows larger, the divisor approaches 2. Besides, it can be seen the simplification of divisor=2 works well in the n=3 case from the following test results). Hence, the value of f (FSR0) can be obtained from the value of f (D0A0), and then the value of f (FSR1) can be obtained by subtracting f (FSR0) from f (D0A1). The value of f(FSR1) is close to the value of the voltage signal in the one point force input case where only force-sensing resistor FSR1 has finite resistance value and other force-sensing resistors have infinite resistance value because of the resistance values of the equivalent resistors KR0, KR3, KR6, KR4 and KR7 of the resistor units R0, R3, R6, R4 and R7 locked by the resistance values of the first resistors R01, R31, R61, R41 and R71 and the second side resistors R02, R32, R62, R42 and R72. Therefore, the relationship between the value of f(FSR1) and the resistance value of the force-sensing resistor FSR1 can be obtained by performing the one point force input testing on the position of the force-sensing resistor FSR1, and then the relationship between the force-sensing resistor FSR1 and the magnitude of the force input is determined by the force-sensing resistor used in the resistive force sensing circuit. That is, the resistance value of the force-sensing resistor FSR1 can be determined by the value of f (FSR1), and the magnitude of the force input applied on the position corresponding to FSR1 can be determined by the resistance value of the force-sensing resistor FSR1. The same method can be used to the other force-sensing resistors to determine the force level applied on the position corresponding to the other force-sensing resistors.

In equation expression, the algorithm can be written as: f(FSR0)=f(D0A0)/2, f(FSR1)=f(D0A1)−f(FSR0), and f(FSR2)=f(D0A2)−f(FSR1) or f(FSR3)=f(D0A3)/2 (because the equivalent circuit of the scanning step D0A3 is substantially the same as the circuit in FIG. 4A).

In general: f(FSRi,0)=f(DiA0)/2, f(FSRi,(j+1))=f(DiA(j+1))−f(FSRi,j) and f(FSRi,(m−1))=f(DiA(m−1))−f(FSRi,(m−2)) or f(FSRi,(m−1))=f(DiAm)/2, 0≤i≤n, 0≤j≤m, where n is the number of the sensor circuit inputs subtracts 1, m is the number of the sensor circuit outputs subtracts 1, and FSRi,j expresses the force-sensing resistor of the position corresponding to the scanning step DiRj.

In this preferred embodiment, the force-sensing resistors used in the resistive force sensing circuit are substantially equal or have identical resistance value for the same force level.

If the force-sensing resistors used in the resistive force sensing circuit are substantially equal or have identical resistance value for the same force input, the one point force input test can only be performed on one force-sensing resistor to obtain the relationship between the values of the digitalized voltage signals and the resistance value of the force-sensing resistors. Therefore, the testing results can be generalized and such results obtained by the test can be used to determine the force level applied on the other points.

It is worth to mention that any extra element in the resistive force sensing circuit of the present invention without substantially changing the function of the resistive force sensing circuit of the present invention should be included in the scope of the present invention. For example, there can be other equal resistors connected in series between the force-sensing resistor and the node of the first and second side resistors in each resistor unit.

Figure 6:
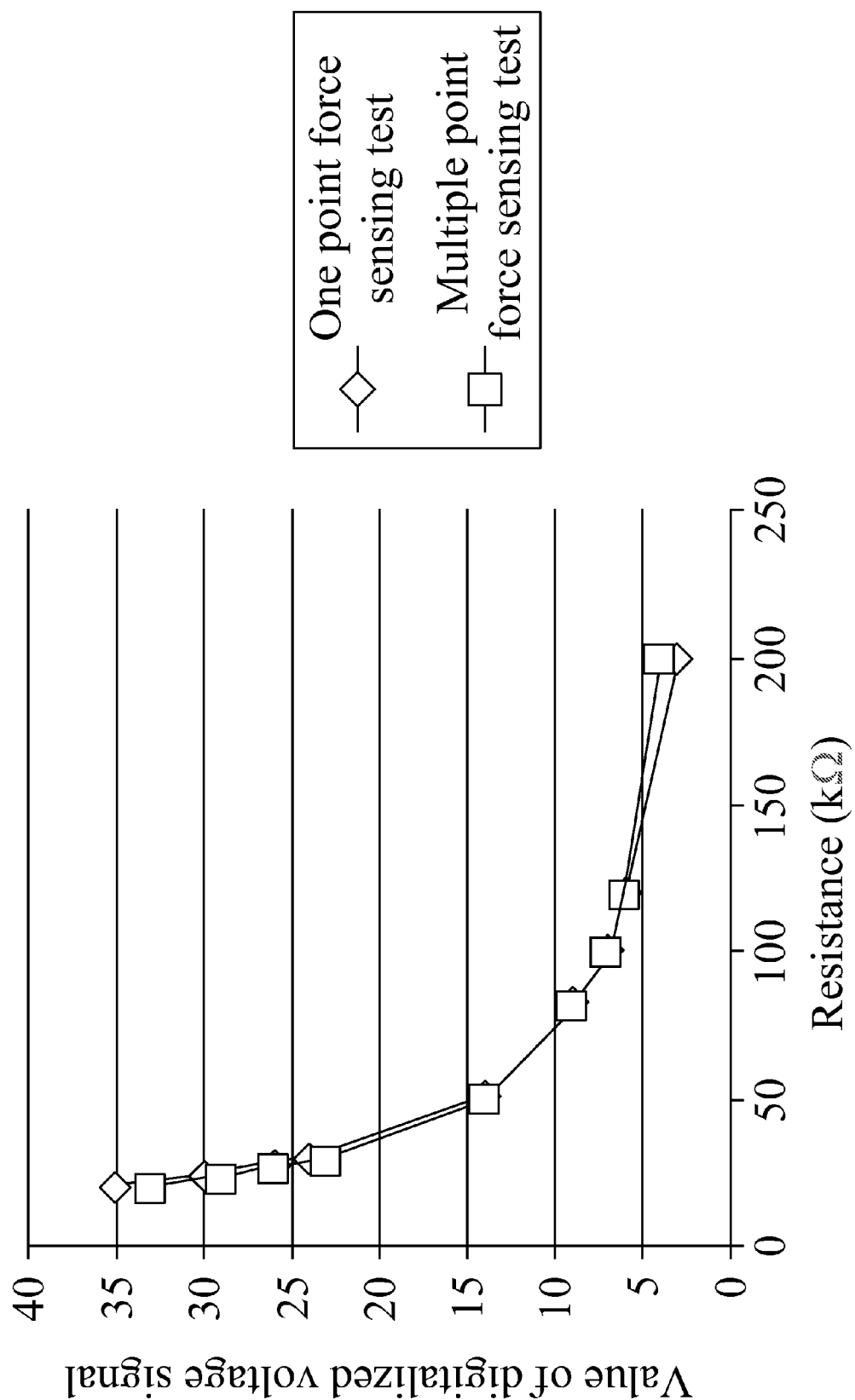
FIG. 6 is a plot showing scanning output value versus resistance value of each force-sensing resistor relationship along one point and multiple point force input situations of the circuit of FIG. 4.

FIG. 6 is a plot showing scanning output value versus resistance value of each force-sensing resistor relationship along one point and multi-point force input situations of the circuit of FIG. 4. The value of the vertical axis is the value f(FSR) obtained by the algorithm mentioned above, and the value of the horizontal axis are different resistance values of the force-sensing resistors. The set values of force-sensing resistors and the DC voltage input for scanning are the same as that of the conventional resistive force sensing circuit in both the one point force input test and the multiple points force input test. The resistance values of first and second side resistors are all equal to 20 k Ohm. It can be seen from FIG. 6, the results of both the one point force input test and the multiple points force input test are almost the same, except for FSR=200 k Ohm, where the value of the digitalized voltage signal of the multiple points force input test is a little lower than that of the one point force input test. However, the tendency of the values the digitalized voltage signal versus the resistance values is still kept, and the error is with the acceptable range. Therefore, the magnitude of the force input at a position corresponding to a certain force-sensing can be still derived by refereeing to the result of the one point force input test performed in advance.

Figure 7:
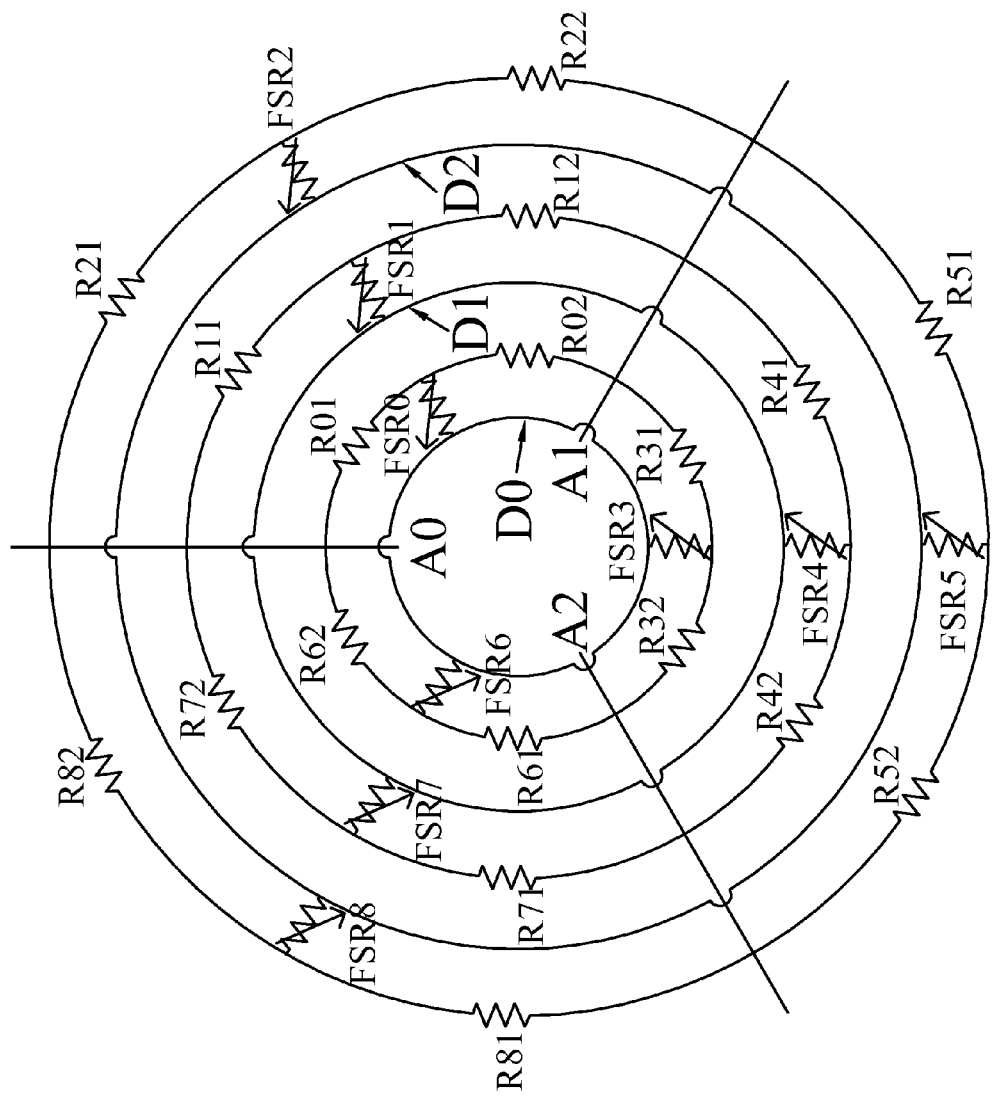
FIG. 7 is a schematic circuit diagram of a resistive force sensing circuit for sensing forces at multiple points according to the forth embodiment of the present invention.

It is worth to mention that the configuration of the sensor circuit inputs and the gaps of two adjacent sensor circuit outputs is not necessary a matrix. With reference to FIG. 7 for a schematic circuit diagram of a resistive force sensing circuit for sensing forces at multiple points according to the forth embodiment of the present invention. In FIG. 7, the sensor circuit inputs D0, D1 and D2 are configured as concentric rings, and the sensor circuit outputs A0, A1 and A2 are configured as radial lines. The electrical connection between the sensor circuit inputs D0, D1 and D2, the sensor circuit outputs A0, A1 and A2, the force-sensing resistors FSR0 to FSR8, and the first and second side resistors R01 to R81 and R02 to R82 are similar to the circuit in FIG. 3. The force-sensing resistor, the first and second side resistors can still form a resistor unit by connecting each other at one point, for example, the force-sensing resistor FSR3, and the first and second side resistors R31 and R32 shown in FIG. 7. The scan method used in this embodiment can be the same as the first embodiment, but the algorithm needs to be modified accordingly. Since the equivalent circuit of each scanning step is similar to the circuit in FIG. 5B, one of such modified algorithms can be derived as following:

$f(FSR0)=(f(D0A0)+f(D0A1)+f(D0A2))/2-f(D0A2)$, $f(FSR3)=(f(D0A0)+f(D0A1)+f(D0A2))/2-f(D0A0)$, $f(FSR6)=(f(D0A0)+f(D0A1)+f(D0A2))/2-f(D0A1)$.

In general, $f(FSRi,j)$=(the sum of the values of $f(DiAj)$ for scanning steps of the same sensor circuit input $Di$)/2−(the sum of the values of $f(DiAj)$ for scanning steps of the same sensor circuit input $Di$ and the sensor circuit outputs . . . , $A(j-3)$, $A(j-1)$, $A(j+2)$, $A(j+4)$ . . . ). $0 \leq i \leq n$, $0 \leq j \leq m$, and where n is the number of the sensor circuit inputs subtracts 1, m is the number of the sensor circuit outputs subtracts 1, and $FSRi,j$ expresses the force-sensing resistor of the position corresponding to the scanning step $DiRj$. It should be noted that the above algorithm only applies to the condition of odd number of the sensor circuit outputs.

When increase of the number of the sensing points is needed, the number of the sensor circuit inputs usually increases accordingly. As the number of the sensor circuit inputs increases, the output voltage decreases as well. For example, if the output voltage (before digitalized) of one resistor unit under a certain force level and drive voltage with 3 sensor circuit inputs in the resistive force sensing circuit is about 200 mV, the output voltage of the same resistor unit under the same force level and drive voltage with 6 sensor circuit inputs in the resistive force sensing circuit is about 100 mV. If the output voltage is too low, it may cause the resistive force sensing circuit difficulty in determining the real force level. To solve the voltage signal drop problem, some voltage adjustment method can be used. On the other hand, the same or similar voltage adjustment can be used in the case that detecting small variation of a certain force level is needed.

Figure 8:
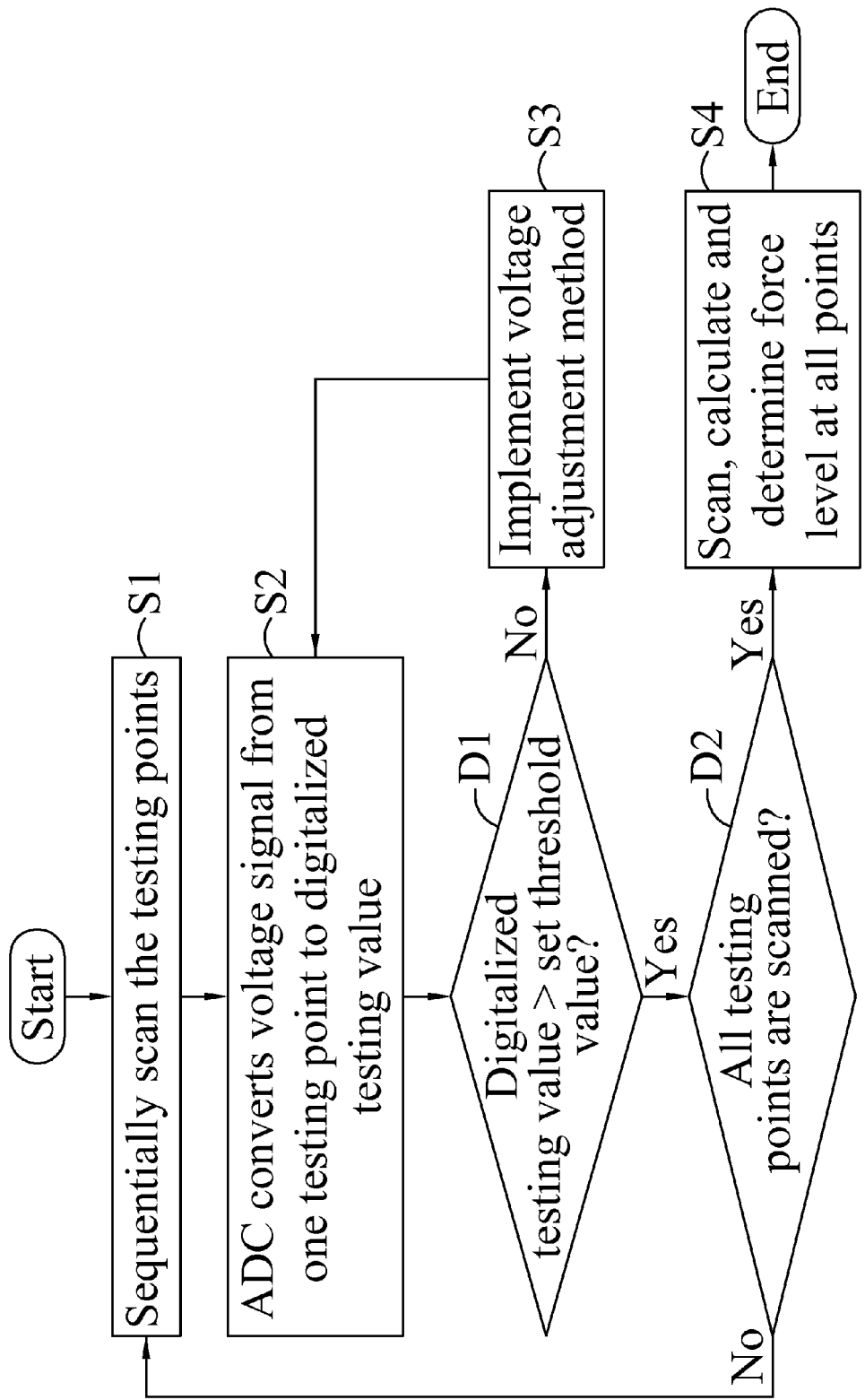
FIG. 8 is a flowchart showing a method of solving voltage signal drop problem in the third embodiment.

FIG. 8 is a flowchart showing how to solve voltage signal drop problem of the third embodiment. With reference to FIG. 8, the method for solving voltage signal drop problem used in the third embodiment will be described step by step. The resistive force sensing circuit in this embodiment has circuit structure in FIG. 4, and the drive circuit 200 further includes a digital-to-analog convertor (DAC) 210, and the scan circuit 300 further includes an analog-to-digital convertor (ADC) 310. In addition, the resistive force sensing circuit further includes a plurality of testing points (not shown). The testing points are electrically connected to drive circuit 200 and scan circuit 300. Particularly, the testing points may have the same circuit structure as the resistor units, and set testing force can be applied on the testing points. Alternatively, the testing points may have the same circuit structure as the resistor units, but resistors with set resistance values replace the FSRs.

In step S1, the drive circuit 200 and scan circuit 300 sequentially scan and measure the testing points, and the scan circuit 300 receives voltage signals from each testing point. In step S2, the ADC 310 of the scan circuit 300 convert an analog voltage signal from one testing point to a digitalized testing signal and send the digitalized testing signal to the MCU 400. In step D1, the MCU 400 determines if the digitalized testing value of the digitalized testing signal is larger than a set threshold value. If not, a voltage adjustment method can be implemented, and then step 2 S2 and D1 can be repeated to determine if the voltage adjustment works to make the digitalize voltage value larger than the set threshold value. After the digitalized testing value is larger than the set threshold value, the resistive force sensing checks if all testing points are scanned in step D2. If not, the aforementioned steps are repeated for the other testing point. Step D2 can make sure that the digitalized testing value from the lowest output voltage among the testing points is larger than the set threshold value. In step S4, after scanning process of all testing points is complete, the resistive force sensing circuit can start to scan the points for real force inputs and then measures and calculates the digitalized signal to obtain the real force level. Since the measurement and calculation methods have been described before, the detailed description is omitted here. What is worthy mention is that the present invention is not limited the above flow, for example, the scanning process of the points for real force input can be implemented and analog outputs of the scanning process can be stored first, and then after scanning the testing points and implementing the voltage adjustment method, the analog voltage signals from points for real force input are digitalized accordingly.

Particularly, the voltage adjustment method may include increasing drive voltage via the DAC 210 in the drive circuit 200. For example, if the MCU 400 finds the digitalized testing value from one testing point is lower than the set threshold value, the DAC 210 doubles the drive voltage in step S4 and thereby the digitalized testing value doubles. The above process repeats until the digitalized testing value is larger than the set threshold value.

Alternatively, the voltage adjustment method may include converting the voltage signal to a digitalized signal according a reference voltage of the ADC 310 of the scan circuit 300, where the ADC 310 can include a reference input Vref. For example, if the MCU 400 finds the digitalized testing value from one testing point in lower than the set threshold value, the reference voltage provided at the reference input Vref halves in step S4 and thereby the digitalized testing value doubles. The above process repeats until the digitalized testing value is larger than the set threshold.

In addition, it is worth to mention that the voltage adjustment method may include adjusting the value of the digitalized voltage signal via DAC 200 and ADC 300 simultaneously.

As mentioned before, the voltage adjustment method can be used to realize the more precise force sensing. For example, the method in FIG. 8 can scan two testing points that respectively receive two predetermined force level input, and the step D1 in FIG. 8 can be changed as: difference between the digitalized testing values from the two testing points>the set threshold voltage? Therefore, because the two predetermined force levels are known, the difference between the digitalized testing values resulted from the two predetermined force levels can be scaled to the desired range.

Figure 9:
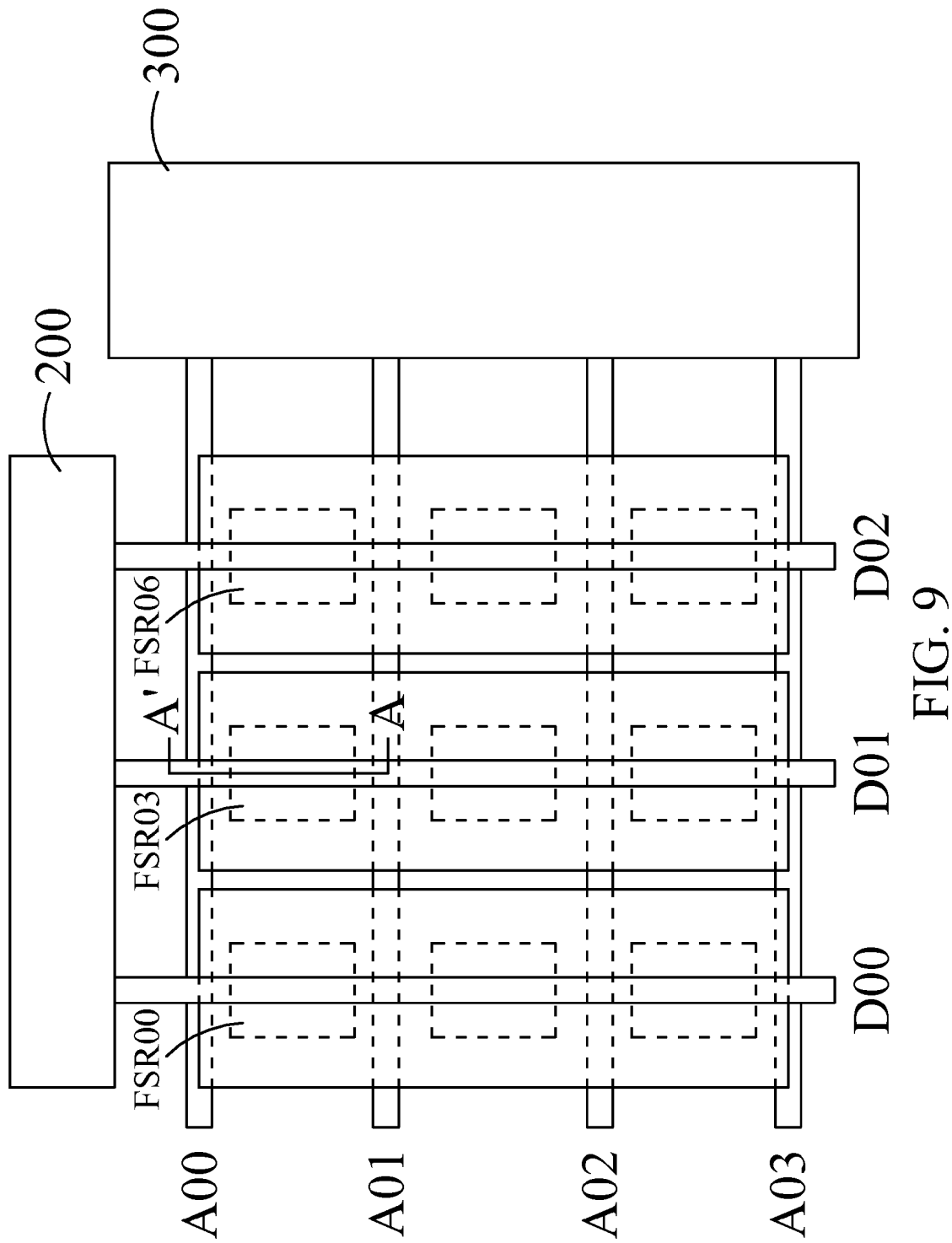
FIG. 9 is a schematic top view of a resistive force sensing apparatus with multi-point force sensing function according to the fifth embodiment of the present invention.
Figure 10:
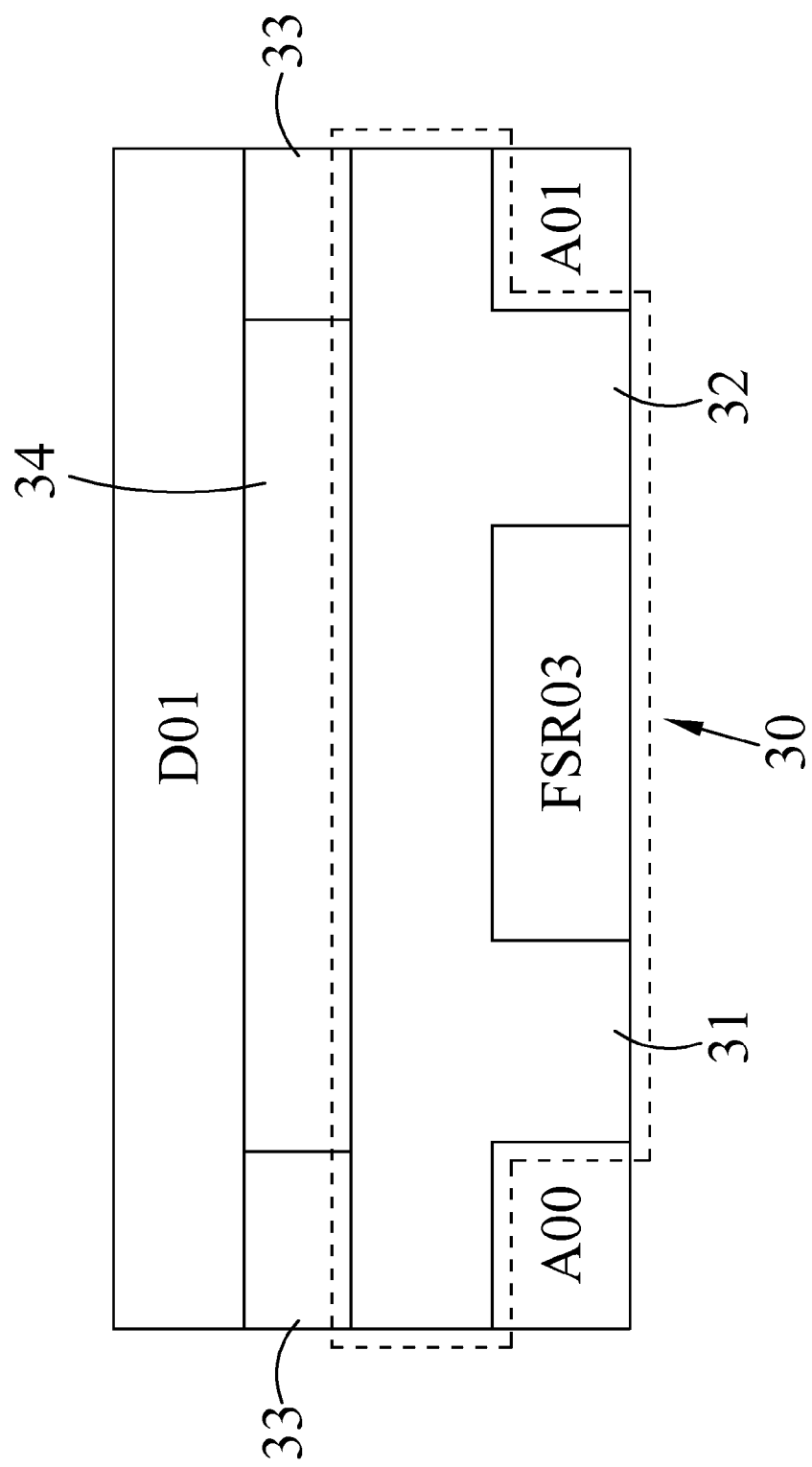
FIG. 10 is a cross-section view of a resistive force sensing apparatus of FIG. 7 along the line A-A'.

With reference to FIG. 9 for a schematic top view of a resistive force sensing apparatus with multiple point force sensing function according to the fifth embodiment of the present invention, and FIG. 10 for a cross-section view of a resistive force sensing apparatus of FIG. 9 along the line A-A'. The resistive force sensing apparatus of the fifth embodiment of the present invention comprises a plurality of sensor input electrodes D00, D01 and D02, a plurality of sensor output electrodes A00 to A03, and a plurality of resistor structures. In FIG. 10, the resistor structure 10 comprises a force-sensing resistor part FSR03, a first side resistor part 31, and a second side resistor part 32, wherein the force-sensing resistor part FSR03 is electrically connected to the sensor input electrodes D01 when a force with sufficient magnitude is applied on the position corresponding to the force-sensing resistor structure FSR03, the first and second side resistor parts 31 and 32 are electrically connected to the force-sensing resistor part, and the first and second side resistor parts 31 and 32 are electrically connected two adjacent sensor output electrodes A00 and A01, respectively. The first and second side resistor parts 31 and 32 are electrically identical resistors. The other resistor structures have the same or similar structures as the resistor structures 30.

In this preferred embodiment, the plurality of sensor input electrodes are a plurality of conductive strips arranged in parallel, and the plurality of sensor output electrode are a plurality of conductive strips arranged in parallel and perpendicular to the plurality of sensor input electrodes. As showed in FIG. 8, the resistive structure included in the resistive force sensing apparatus can be seen as a 3*3 matrix, where the matrix columns are defined by the sensor input electrodes D00, D01 and D02 in strip shape, and the matrix rows are defined by the gaps of the sensor output electrodes A00 to A03 in strip shape. However, the present invention is not limited thereto, and the size of the matrix structure can easily be expanded.

In this preferred embodiment, the resistive force sensing apparatus further comprises a drive circuit 200 and a scan circuit 300. The drive circuit 200 is electrically connected to and sequentially scans and drives the sensor input electrodes D00, D01 and D02, and the scan circuit 300 is electrically connected to and sequentially measures the sensor input electrodes A00 to A03.

The disclosed structure of the resistive force sensing apparatus is to realize the resistive force sensing circuit disclosed above. The plurality of sensor input electrodes D00, D01 and D02 of the resistive force sensing apparatus correspond to the plurality of the sensor circuit inputs D0, D1 and D2. The plurality of sensor output electrodes A00 to A03 correspond to the plurality of the sensor circuit outputs A0 to A3. The input and sensor output electrodes D00 to D02 and A00 to A03 can be formed as strips with good conductivity, such as metal strips, arranged in parallel. The plurality of resistor structures corresponds to the plurality of resistor units R0 to R8. The force-sensing resistor parts FSR00, FSR01 and so on correspond to the function of the force-sensing resistors FSR0 to FSR8, which is the resistance values change with the magnitude of the force level, such as a force from fingers. The first side resistor parts correspond to the first resistors R01 to R81, and the second side resistor parts correspond to the second resistors R02 to R82. The functions of drive circuit 200 and the scan circuit 300 are the same or similar to the above mentioned. Therefore, the resistive force sensing apparatus with a suitable algorithm can realize the multiple points force sensing function.

In this preferred embodiment, the first side resistor part and the second resistor part are the material having high resistance, and all of or part of the first side resistor parts and the second resistor parts of the resistive force sensing apparatus are substantially continuous.

To prevent or reduce the leaking currents between the different resistor structures, the first and second side resistor parts may have high resistance. Therefore, the leaking can be prevented or reduced since it is difficult for the current flowing through the material with high resistance to become high enough to affect the output result of the resistive force sensing circuit or the resistive force sensing apparatus. Further, the material of the first and second resistor parts and can be the same, and such material can be used to be the material with high resistance. In this case, the resistor structures should be arranged to be separated from each other in a sufficient distance to let the material fills in so that the structure with enough resistance can be form between the resistor structures.

In FIG. 10, the first and second resistor parts 11 and 12 can be entirely or partly continuous, and the first and second resistor parts 11 and 22 can be formed by conventional deposition and etching technique. Because of the continuous structure of the first and second resistor parts 11 and 12, the steps the deposition process or the mask for etching can be simplified. Therefore, the process of manufacturing the resistive force sensing apparatus can be simplified and the cost of production can be further reduced. It is worth to mention that the resistive structure above the force-sensing resistor part FSR01 can be seen as a simple resistor connected in series between the sensor input electrodes D01 and the force-sensing resistor FSR01 while enough force on the part of the sensor input electrodes D01 in FIG. 10, and thus the equivalent circuit configuration does not vary with the extra resistive structure, or the extra resistive structure and the force-sensing resistor part FSR01 can be consider together as a equivalent force-sensing resistor in circuits.

In this preferred embodiment, the resistive force sensing apparatus further comprises a plurality of spacers. If there is no force applied on a part of the resistive force sensing apparatus, the spacers separate the sensor input electrode D00, D01 and D02 from the resistor structure corresponding to the part of the resistive force sensing apparatus, making the sensor input electrode D00, D01 and D02 and the sensor output electrodes A00 to A04 corresponding to the part of the resistive force sensing apparatus electrically form an open-loop.

Referring back to FIG. 10, there are the spacers 33 separating the sensor input electrode D01 from the resistor structure 10 as there is not force applied on the part of the sensor input electrode D01. When there is force with sufficient magnitude on the part of the sensor input electrode D01, the part of the sensor input electrode D01 is depressed and contacts the top surface of the resistor structure 30, and then the sensor input electrode D01 and the sensor output electrodes A00 and A01 form a loop via the resistor structure 30. Therefore, when there is no force applied on the part of the sensor input electrode D01, a gap 34 exists between the sensor input electrode D01 and the resistor structure 30 and no current will flow through the resistor structure 30 during scanning, and the electricity the resistive force sensing apparatus consumes can be reduced. It should be noted that the gaps, which are between the sensor input electrodes and the resistor structures, and the force-sensing resistor parts can be seen together as equivalent force-sensing resistors, and such equivalent force-sensing resistors have infinite resistance while the magnitude of the force applied is not large enough or there is no force applied on the positions corresponding to the equivalent force-sensing resistors.

Figure 11:
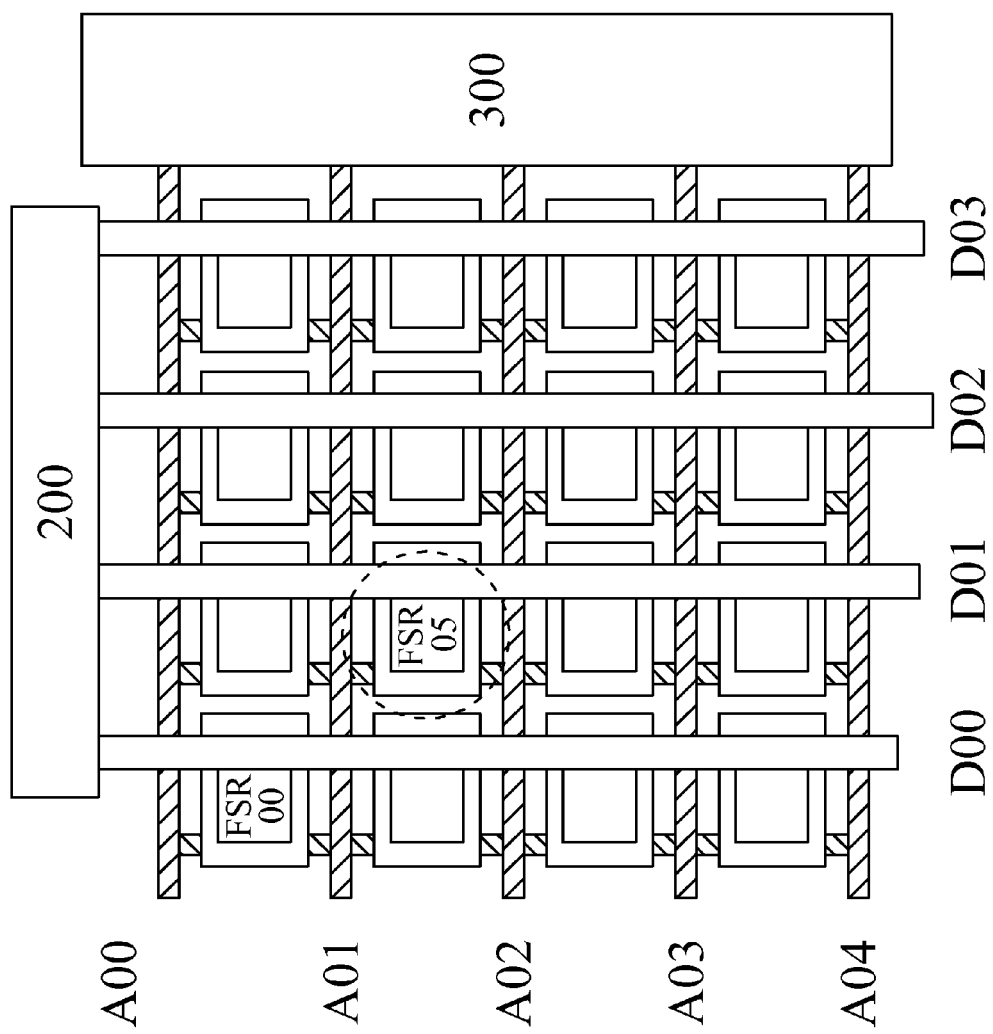
FIG. 11 is a schematic top view of a resistive force sensing apparatus with multi-point force sensing function according to the sixth embodiment of the present invention.
Figure 12:
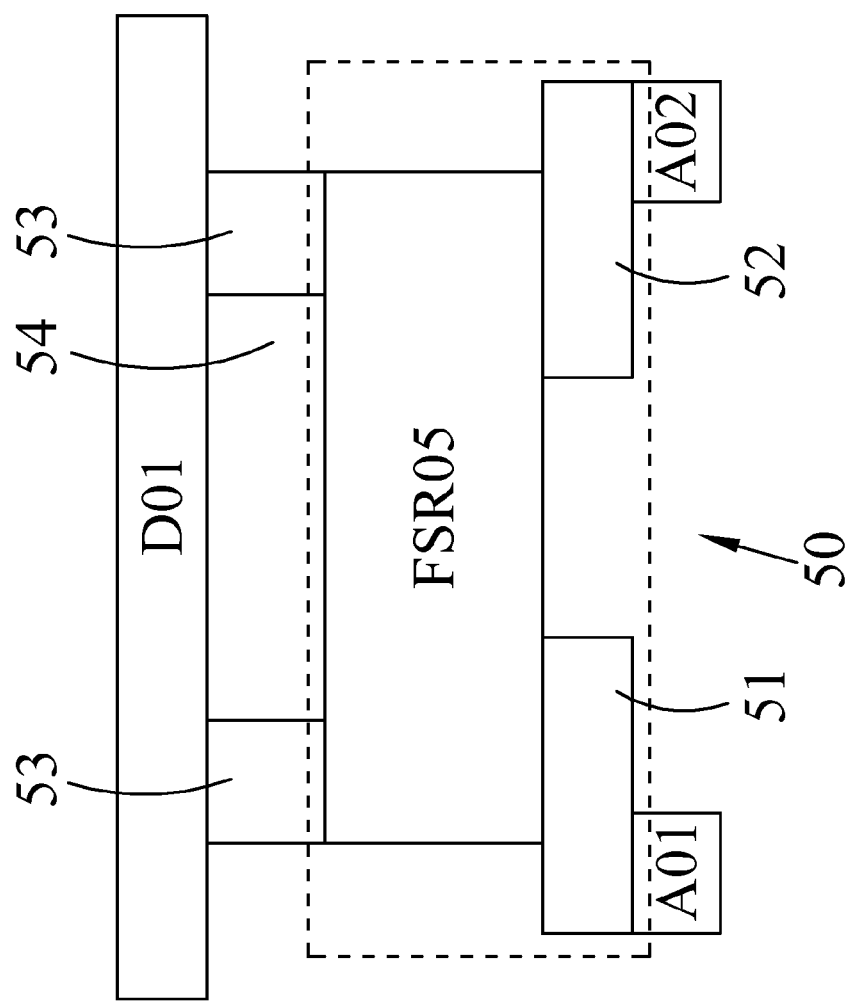
FIG. 12 is a schematic view of one resistor unit and electrodes connected to the resistor unit structure of the resistive apparatus, which correspond to the portion of the circle of the dotted line of FIG. 11.

FIG. 11 is a schematic top view of a resistive force sensing apparatus with multiple point force sensing function according to the sixth embodiment of the present invention, and FIG. 12 is a schematic view of one resistor unit and electrodes connected to the resistor unit structure of the resistive force sensing apparatus in a circle of a dotted line of FIG. 11.

In this embodiment, it can be seen that not only the structure of the fifth embodiment but also other structures can realize the resistive mentioned above, such as the structure of the resistive force sensing apparatus of the sixth embodiment of the present invention. As showed in FIG. 11, the resistive structure included in the resistive force sensing apparatus can be seen as a 4*4 matrix, and the method to define the matrix is similar to the fifth embodiment of the present invention in FIG. 9. It is worth to mention that the resistor structures 00 to 80 of the sixth embodiment in FIG. 11 are substantially separated from each other, in other words, they are separated from each other by air, which can be the equivalent of the material with high resistance mentioned above. However, the present invention is not limited thereof, other materials with high resistance still can be used to separate the resistor structures of the resistive force sensing apparatus of the present invention. In addition, the first and second side resistor parts are not continuous as the first and second side resistor parts 51 and 52 showed in FIG. 12. Therefore, although the complexity of the manufacturing process may increase, it may be easier to fine tune the resistance values of the first and second side resistor parts and keep them electrically identical or similar. The spacer 53 and the gap 54 are similar as the counterpart in the structure shown in FIG. 10, so the description is omitted.

In addition, the resistive force sensing apparatus may include a DAC in the drive circuit 200, or an ADC in the scan circuit 300. Therefore, the resistive force sensing apparatus can implement the voltage adjustment method as mentioned in the circuit description. Since the operation has been described in the above description, the detailed description is omitted here.

In summation of the description above, the resistive force sensing apparatus of the present invention can integrally include the substantial elements of the resistive force sensing circuit, and realize the function of multiple point force sensing of the resistive force sensing circuit. In the meantime, the leaking current between the resistor structures can be prevented or reduced. The structure of the resistive force sensing apparatus can be easily manufactured by using the convention manufacturing techniques, and the entire apparatus can be easily scaled down due to its simple structure.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A resistive force sensing circuit, comprising:
   a plurality of sensor circuit inputs;
   a plurality of sensor circuit outputs; and
   a plurality of resistor units, each of the resistor units comprising a force-sensing resistor, a first side resistor, and a second side resistor, wherein first terminals of the force-sensing resistor, the first side resistor and the second side resistor are electrically connected to each other at one node, a second terminal of the force-sensing resistor is electrically connected to one of the sensor circuit inputs, second terminals of the first side resistor and the second side resistor are electrically connected to two adjacent sensor circuit outputs of the sensor circuit outputs, respectively, and the first side resistor and the second side resistor are a pair of resistors with substantially equal resistance, and the force-sensing resistor of each of the plurality of resistor units are independent of one another;
   wherein results of a one point force input test and a multi-point force input test are the same while a same force level is applied.

2. The resistive force sensing circuit of claim 1, wherein the plurality of sensor circuit inputs are configured as columns in a matrix, and the sensor circuit outputs are configured as rows, or the plurality of sensor circuit inputs are configured as rows in a matrix, and the sensor circuit outputs are configured as columns, and the plurality of resistor units are configured as matrix units defined by intersections of the sensor circuit inputs and the nodes of two side resistors between adjacent sensor circuit outputs.

3. The resistive force sensing circuit of claim 1, further comprising:
   a drive circuit, electrically connected to and sequentially scanning the sensor circuit inputs; and
   a scan circuit, electrically connected to and sequentially measuring the sensor circuit outputs.

4. The resistive force sensing circuit of claim 3, wherein the force-sensing resistors used in the resistive force sensing circuit are substantially equal or have identical resistance value for the same force level.

5. The resistive force sensing circuit of claim 3, wherein the drive circuit further comprises a digital-to-analog convertor providing a variable drive voltage.

6. The resistive force sensing circuit of claim 3, wherein the scan circuit further comprises an analog-to-digital convertor converting an analog voltage signal from the sensor circuit output to a digitalized voltage signal depending on a variable reference voltage.

7. A resistive force sensing apparatus, comprising:
   a plurality of sensor input electrodes;
   a plurality of sensor output electrodes; and
   a plurality of resistor structures, each of the resistor structure comprising a force-sensing resistor part, a first side resistor part, and a second side resistor part, wherein the first and second side resistor parts are electrically connected to the force-sensing resistor part, the first and second side resistor parts are electrically connected two adjacent sensor output electrodes, respectively, and the first and second side resistor parts have substantially equal resistance values, and the force-sensing resistor part of each of the plurality of structures are independent of one another;
   wherein results of a one point force input test and a multi-point force input test are the same while a same force level is applied.

8. The resistive force sensing apparatus of claim 7, wherein the plurality of sensor input electrodes are a plurality of conductive strips arranged in parallel, and the plurality of sensor output electrode are a plurality of conductive strips arranged in parallel and perpendicular to the plurality of sensor input electrodes.

9. The resistive force sensing apparatus of claim 7, further comprising:
   a drive circuit, electrically connected to and sequentially scanning the sensor input electrodes; and
   a scan circuit, electrically connected to and sequentially measuring the sensor input electrodes.

10. The resistive force sensing apparatus of claim 9, wherein the drive circuit further comprises a digital-to-analog convertor providing a variable drive voltage.

11. The resistive force sensing apparatus of claim 9, wherein the scan circuit further comprises an analog-to-digital convertor converting an analog voltage signal to a digitalized voltage signal depending on a variable reference voltage.

12. The resistive force sensing apparatus of claim 7, wherein the first side resistor part and the second resistor part are substantially continuous.

13. The resistive force sensing apparatus of claim 7, further comprising:
   a plurality of spacers,
   wherein each spacer separates the sensor input electrode and the resistor structure while no force is applied on a position corresponding to the resistor structure or a force applied on the position is not enough, making the sensor input electrode and the sensor output electrode corresponding to the resistive structure electrically form an open-loop.

* * * * *